(12) United States Patent
Abram et al.

(10) Patent No.: US 9,509,771 B2
(45) Date of Patent: Nov. 29, 2016

(54) PRIORITIZING STORAGE ARRAY MANAGEMENT COMMANDS

(71) Applicant: INTERNATIONAL BUSINESS MACHINES CORPORATION, Armonk, NY (US)

(72) Inventors: Polina Abram, Ra'anana (IL); Daniel I. Goodman, Beit Shemesh (IL); Ran Harel, Kfar-Saba (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 370 days.

(21) Appl. No.: 14/155,126

(22) Filed: Jan. 14, 2014

(65) Prior Publication Data

US 2015/0201018 A1    Jul. 16, 2015

(51) Int. Cl.
G06F 17/30 (2006.01)
H04L 29/08 (2006.01)
H04L 12/24 (2006.01)

(52) U.S. Cl.
CPC ........... *H04L 67/1097* (2013.01); *H04L 41/00* (2013.01); *H04L 67/322* (2013.01)

(58) Field of Classification Search
USPC .......................................................... 707/736
See application file for complete search history.

(56) References Cited

U.S. PATENT DOCUMENTS

| | | |
|---|---|---|
| 7,065,616 B2 | 6/2006 | Gajjar et al. |
| 7,089,381 B2 | 8/2006 | Horn et al. |
| 7,376,786 B2 | 5/2008 | Williams |
| 7,657,613 B1 | 2/2010 | Hanson et al. |
| 7,797,468 B2 * | 9/2010 | Shin ............... G06F 3/0611 710/111 |
| 7,945,640 B1 | 5/2011 | Vantine |
| 7,979,603 B2 * | 7/2011 | Yamaguchi ....... G06F 3/0611 710/264 |
| 8,209,439 B2 * | 6/2012 | Marcu .............. G06F 3/0611 710/6 |
| 8,341,119 B1 | 12/2012 | Roussos et al. |
| 8,402,118 B2 | 3/2013 | Finnegan et al. |
| 8,478,845 B2 | 7/2013 | Agarwala et al. |
| 9,092,156 B1 * | 7/2015 | Xu ................... G06F 3/0659 |

(Continued)

OTHER PUBLICATIONS

Kang et al., Virtual Allocation: A Scheme for Flexible Storage Allocation, Oct. 13, 2004, 6 pages, Proceedings of the OASIS workshop in conjunction with ASPLOS, Association for Computing Machinery, Washington DC, Texas A&M University, Boston, MA.

(Continued)

*Primary Examiner* — Debbie Le
(74) *Attorney, Agent, or Firm* — Griffiths & Seaton PLLC (57) ABSTRACT

Methods, apparatus and computer program products implement embodiments of the present invention that include defining, by a first computer in communication with a storage system, at least two priority levels for storage management commands to be processed by the storage system, and defining a respective queue for each of the defined priority levels. Upon receiving multiple storage management commands from one or more second computers in communication with the first computer and the storage system, a respective priority is determined for each of the received storage management commands, and the respective queue is identified for each of the received storage management commands based on the respective priority thereof. Each of the received storage management commands is loaded to the respective identified queue thereof, and the received storage management commands stored in the respective queues are processed by the storage system according to the priority levels thereof.

20 Claims, 4 Drawing Sheets

(56) References Cited

U.S. PATENT DOCUMENTS

| | | | |
|---|---|---|---|
| 2003/0056034 A1* | 3/2003 | Olds | G06F 3/0601 |
| | | | 710/5 |
| 2007/0233868 A1 | 10/2007 | Tyrrell et al. | |
| 2008/0313414 A1 | 12/2008 | Shackelford | |
| 2009/0240880 A1 | 9/2009 | Kawaguchi | |
| 2010/0138605 A1 | 6/2010 | Kazar et al. | |
| 2010/0306467 A1 | 12/2010 | Pruthi et al. | |
| 2011/0022642 A1 | 1/2011 | Demilo et al. | |
| 2011/0131443 A1 | 6/2011 | Laor et al. | |
| 2011/0321052 A1* | 12/2011 | Long | G06F 9/4843 |
| | | | 718/103 |
| 2012/0139930 A1* | 6/2012 | Rogers | G06T 1/20 |
| | | | 345/522 |
| 2012/0198073 A1 | 8/2012 | Srikanth et al. | |
| 2012/0198190 A1 | 8/2012 | Hart et al. | |
| 2013/0067164 A1 | 3/2013 | Velayudhan et al. | |
| 2013/0111471 A1 | 5/2013 | Chandrasekaran | |
| 2013/0117448 A1 | 5/2013 | Nahum et al. | |
| 2013/0179614 A1* | 7/2013 | Ross | G06F 13/385 |
| | | | 710/264 |
| 2013/0246922 A1 | 9/2013 | Doerr et al. | |

OTHER PUBLICATIONS

A System and Method for Providing Meta-data Model Based Distributed Data, Feb. 3, 2012.

Method and System for Extracting Meta-data for Interactions over Collaborative Applications, Aug. 26, 2010.

Papazoglou et al., "Blueprinting the cloud." pp. 74-79, IEEE 15.6 (2011), Internet Computing.

* cited by examiner

PRIORITIZING STORAGE ARRAY MANAGEMENT COMMANDS

FIELD OF THE INVENTION

The present invention relates generally to data storage, and specifically to prioritizing storage array management commands.

BACKGROUND

In addition to receiving and processing data input/output (I/O) requests, storage arrays can receive and process storage management commands. Storage management commands can have different priorities based on the time sensitivity of the operation associated with the command and/or the length of time it takes to complete the operation. Examples of a higher priority storage commands include, but are not limited to snapshot creation commands and commands to add space to a logical volume. Examples of lower priority storage commands include, but are not limited to volume copy commands and volume creation commands.

The description above is presented as a general overview of related art in this field and should not be construed as an admission that any of the information it contains constitutes prior art against the present patent application.

SUMMARY

There is provided, in accordance with an embodiment of the present invention a method, including defining, by a first computer in communication with a storage system, at least two priority levels for storage management commands to be processed by the storage system, defining a respective queue for each of the defined priority levels, receiving, from one or more second computers in communication with the first computer and the storage system, multiple storage management commands, determining a respective priority for each of the received storage management commands, identifying the respective queue for each of the received storage management commands based on the respective priority thereof, loading each of the received storage management commands to the respective identified queue thereof and processing, by the storage system, the received storage management commands stored in the respective queues according to the priority levels thereof.

There is also provided, in accordance with an embodiment of the present invention a storage facility, including a storage system, and a first computer in communication with the storage system and configured to define at least two priority levels for storage management commands to be processed by the storage system, to define a respective queue for each of the defined priority levels, to receive, from one or more second computers in communication with the first computer and the storage system, multiple storage management commands, to determine a respective priority for each of the received storage management commands, to identify the respective queue for each of the received storage management commands based on the respective priority thereof, and to load each of the received storage management commands to the respective identified queue thereof.

There is further provided, in accordance with an embodiment of the present invention a computer program product, the computer program product including a non-transitory computer readable storage medium having computer readable program code embodied therewith, the computer readable program code including computer readable program code executing on a first computer in communication with a storage system and configured to define at least two priority levels for storage management commands to be processed by the storage system, to define a respective queue for each of the defined priority levels, to receive, from one or more second computers in communication with the first computer and the storage system, multiple storage management commands, to determine a respective priority for each of the received storage management commands, to identify the respective queue for each of the received storage management commands based on the respective priority thereof, and to load each of the received storage management commands to the respective identified queue thereof, and computer readable program code executing on the storage system and configured to process the received storage management commands stored in the respective queues according to the priority levels thereof.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Embodiments of the present invention provide methods and systems for prioritizing storage management commands in order to ensure that higher priority storage management commands are processed by a storage system in a timely manner, and to ensure that lower priority commands receive fair service levels. In some embodiments, a management server in communication with the storage system can define, at least two priority levels for storage management commands to be processed by the storage system, and can define a respective queue for each of the defined priority levels.

Upon receiving multiple storage management commands from one or more host computers in communication with the management server and the storage system, the management server can determine a respective priority for each of the received storage management commands, identify the respective queue for each of the received storage management commands based on the respective priority thereof, and loading each of the received storage management commands to the respective identified queue thereof.

After the storage commands are loaded to their respective queues, the storage system can process the received storage management commands stored in the respective queues according to the priority levels thereof. In some embodiments, the storage system can process the storage management commands by fetching the storage management commands from the respective queues in a round-robin order, and performing the storage management commands in the round-robin order, thereby ensuring timely completion of the storage management requests.

Figure 1:
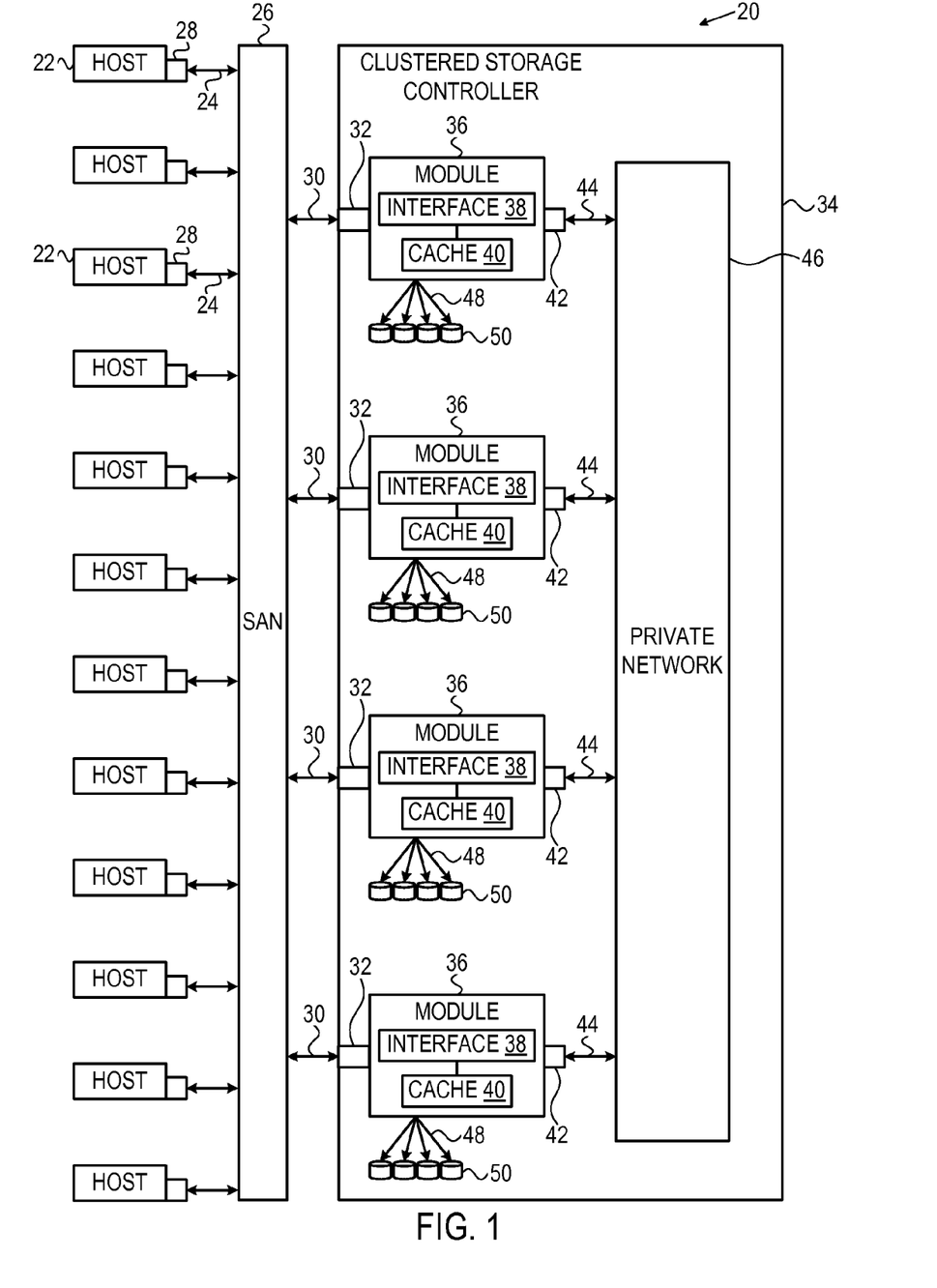
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage array or a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
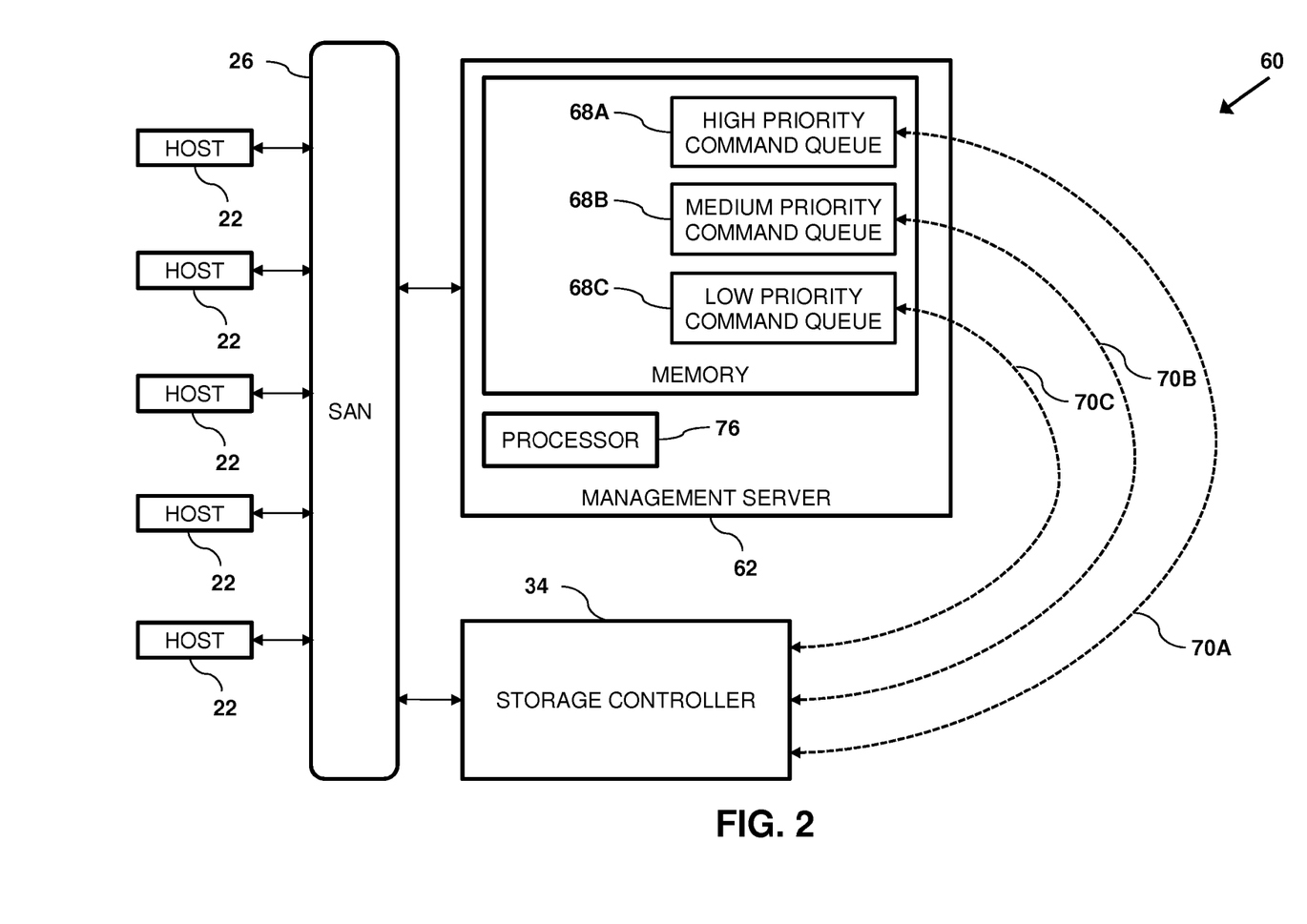
FIG. 2 is a block diagram of a storage facility configured to prioritize storage management commands, in accordance with an embodiment of the present invention.

FIG. 2 is a block diagram showing a storage facility 60 that is configured to prioritize storage management commands, in accordance with an embodiment of the present invention. Storage facility 60 comprises a management server 62 in communication with storage controllers 34 and host computers 22 via SAN 26.

While embodiments herein describe SAN 26 conveying data requests and storage management commands from host computers 22 to storage controller 34, other configurations are considered to be within the spirit and scope of the present invention. For example, storage facility 60 may comprise a first network (e.g., SAN 26) configured to convey data requests from host computer 22 to storage controller 34 and a second network configured to convey storage management commands from the host computers to the storage controller. Alternatively, management server 60 can communicate with storage controller 34 over SAN 26 using Internet Protocol (IP) commands and/or SCSI commands.

Management server 62 comprises a processor 64 and a memory 66. As explained hereinbelow, processor 64 initializes and manages, in memory 66, multiple first-in-first-out (FIFO) storage command queues 68. In the configuration shown in FIG. 2, queues 68 can be differentiated by appending a letter to the identifying numeral, so that the queues comprise a high priority storage command queue 68A, a medium priority storage command queue 68B and a low priority storage command queue 68C. While the configuration in FIG. 2 shows processor 64 managing three storage command queues 68, any number of storage command queues 68 in memory 66 is considered to be within the spirit and scope of the present invention.

In operation storage controller 34 communicates with each storage command queue 68 via a respective management path (i.e., logical paths) 70. In the configuration shown in FIG. 2, management paths 70 can be differentiated by appending a letter to the identifying numeral, so that the management paths comprise management path 70A between the storage controller and the high priority command queue, management path 70B between the storage controller and the medium priority command queue, and a management path 70C between the storage controller and the low priority command queue.

Processor 64 typically comprises a general-purpose computer, which are programmed in software to carry out the functions described herein. The software may be downloaded to cloud management server 64 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Storage Command Prioritization

Figure 3:
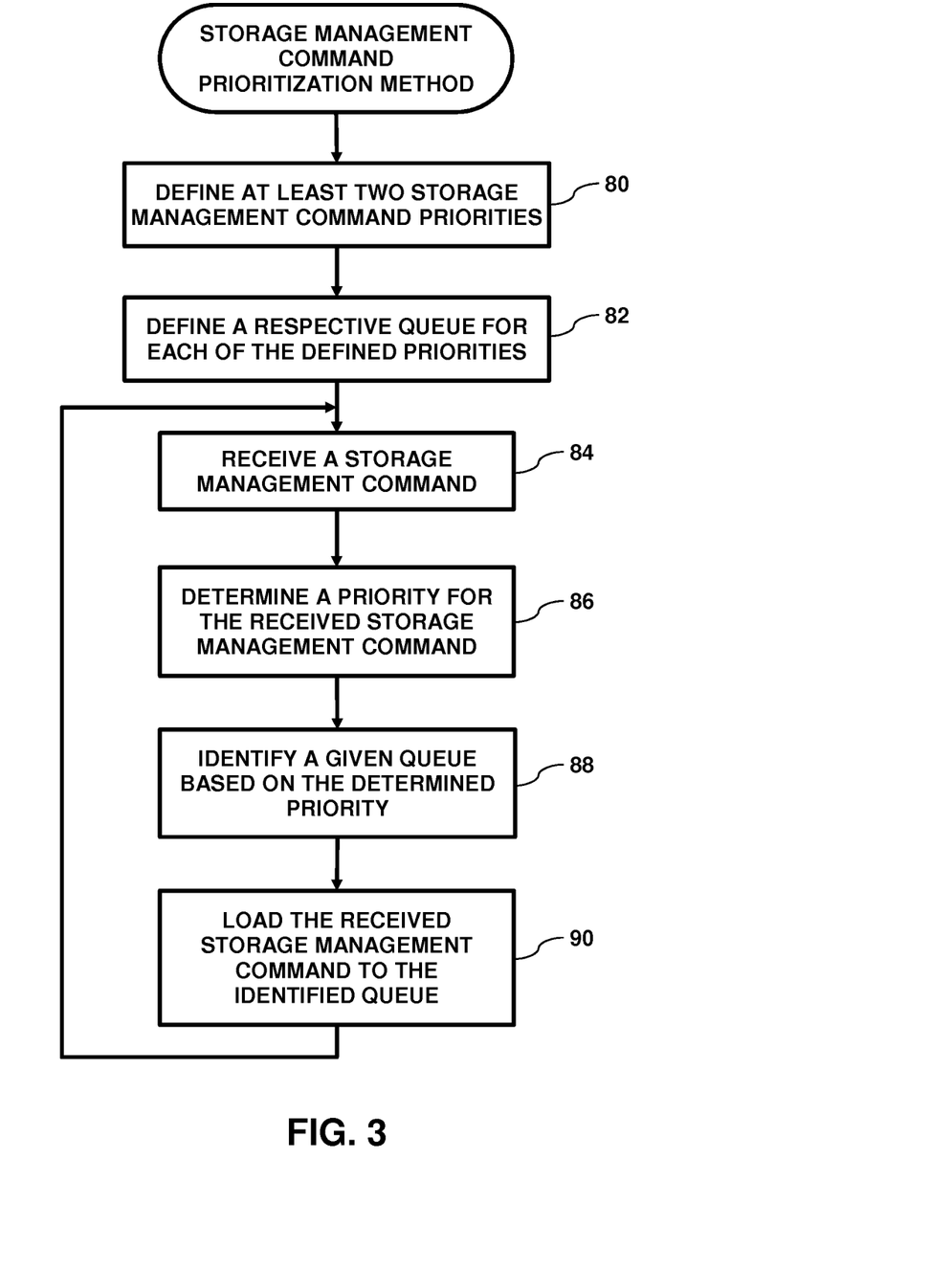
FIG. 3 is a flow diagram that schematically illustrates a method of prioritizing storage management commands, in accordance an embodiment of the present invention.

FIG. 3 is a flow diagram that schematically illustrates a method of prioritizing storage management commands received from host computers 22, in accordance with an embodiment of the present invention. In first definition step 80, processor 64 defines at least two storage command priority levels, and in a second definition step 82, the processor defines a respective queue 68 for each of the defined priority levels. In the example shown in FIG. 3, processor 64 defines a high priority level, a medium priority level and a low priority level, and defines respective queues 68A, 68B and 68C.

In a receive step 84, processor 64 receives, from a given host computer 22, a storage management command, and in a determination step 86, the processor determines a priority for the received storage command. In some embodiments, processor 64 can determine the respective priority for a given storage command by determining a time sensitivity of the given storage management command, and assigning the respective priority based on the time sensitivity. For example, a snapshot command can be assigned a high priority, a system configuration command can be assigned a medium priority, and a volume creation command can be assigned a low priority.

In additional embodiments, processor 64 can assign a respective priority of a given storage management command by determining a length of execution time of the given storage management command, and assigning the respective priority based on the length of execution time. For example, a volume copy that takes a long time to perform command can be assigned a lower priority than a volume move command that can be performed quickly.

In further embodiments, processor 64 can assign a respective priority of a given storage management command by determining a respective storage profile of a given host computer 22 that conveyed the given storage management command, and assigning the respective priority based on the respective storage profile. In some embodiments, storage profiles can be assigned to virtual machines executing one or more host computers 22.

In supplemental embodiments, processor 64 can identify, in a given queue 68, multiple storage management commands that perform a similar function, and combine the multiple storage management commands into a single storage management command. Alternatively, upon processor 64 receiving a given storage management command and detecting a previously received storage management command in a given queue 68, the processor can update the previously received storage management command to include the given storage management command.

For example, if processor 64 identifies, in the low priority command queue, multiple volume creation commands to create multiple volumes, the processor can identify the oldest instance of the volume creation command, and replace the oldest instance with a volume creation command to create the multiple volumes.

In an identification step 88, processor 64 identifies the respective queue 68 for each of the received storage management commands based on the respective priority thereof, loads each of the received storage commands to the respective identified queue thereof in a load step 90, and the method ends. In the configuration shown in FIG. 2, processor loads high priority storage management commands to queue 68A, medium priority storage management commands to queue 68B, and low priority storage management commands to queue 68C.

Storage Command Prioritization

Figure 4:
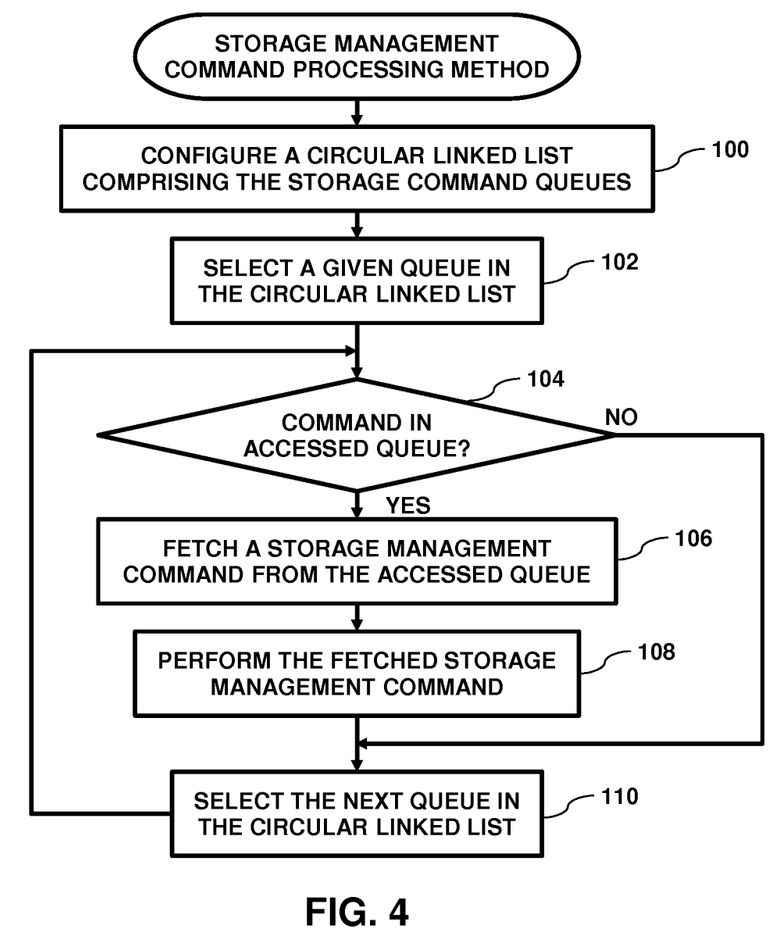
FIG. 4 is a flow diagram that schematically illustrates a method of fetching and processing storage management commands stored in the storage management command queues, in accordance an embodiment of the present invention.
Figure 5:
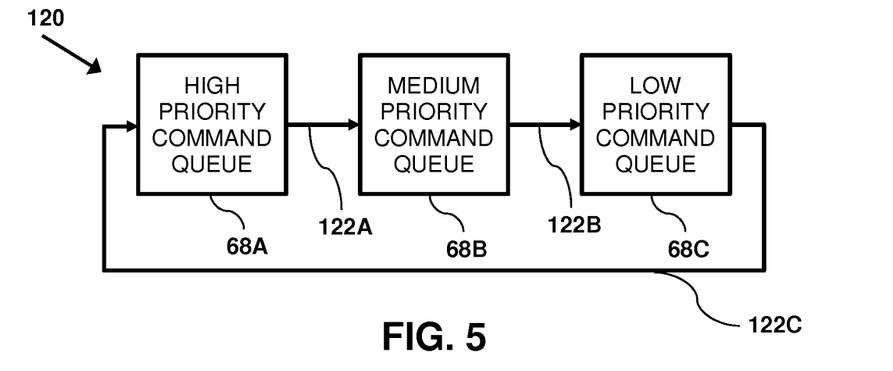
FIG. 5 is a block diagram that schematically illustrates storage management command queues arranged in a circular linked list configuration, in accordance with an embodiment of the present invention.

FIG. 4 is a flow diagram that schematically illustrates a method of fetching storage management commands from queues 68 and processing the storage management commands, and FIG. 5 is a block diagram that schematically illustrates queues 68 arranged in a circular linked list 120, in accordance with an embodiment of the present invention.

In a configuration step 100, processor 64 configures queues 68 as circular linked list 120. In linked list 120, queue 68A links to queue 68B via a pointer 122A, queue 68B links to queue 68C via a pointer 122B, and queue 68C links to queue 68A via a pointer 122C.

In a first selection step 102, processor selects a given queue 68 in linked list 120 (e.g., queue 68A). In a comparison step 104, if the selected queue contains any storage management commands, then processor 64 fetches a given storage management command from the front of the selected queue in a fetch step 106, and performs the given storage management command in a perform step 108. In a second selection step 110, processor 68 traverses linked list 120 to select the next queue 68 in the linked list, and the method continues with step 104. By traversing linked list 120, processor 64 fetches storage commands from queues 68 in a round-robin order, thereby ensuring that storage management commands in the high priority queue are processed as quickly as possible, and ensuring that all the storage management commands in queues 68 are completed in a timely manner.

Returning to step 104, if the selected queue is empty, then the method continues with step 110.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining, by a first computer in communication with a storage system, at least two priority levels for storage management commands to be processed by the storage system;
defining a respective queue for each of the defined priority levels;
receiving, from one or more second computers in communication with the first computer and the storage system, multiple storage management commands;
determining a respective priority for each of the received storage management commands;
identifying the respective queue for each of the received storage management commands based on the respective priority thereof;
loading each of the received storage management commands to the respective identified queue thereof; and
processing, by the storage system, the received storage management commands stored in the respective queues according to the priority levels thereof.

2. The method according to claim 1, wherein determining the respective priority of a given storage management command comprises determining a time sensitivity of the given storage management command, and assigning the respective priority based on the time sensitivity.

3. The method according to claim 1, wherein determining the respective priority of a given storage management command comprises determining length of execution time of the given storage management command, and assigning the respective priority based on the length of execution time.

4. The method according to claim 1, wherein each of the one or more second computers has a respective storage profile, and wherein determining the respective priority of a given storage management command comprises identifying a respective storage profile of a given second computer that conveyed the given storage management command, and assigning the respective priority based on the identified storage profile.

5. The method according to claim 1, and comprising identifying, in a given queue, multiple storage management commands that perform a similar function, and combining the multiple storage management commands into a single storage management command.

6. The method according to claim 1, wherein processing the storage management commands comprises fetching the storage management commands from the respective queues in a round-robin order, and performing the storage management commands in the round-robin order.

7. The method according to claim 1, wherein each of the respective queues has a respective management path between the first computer and the storage system.

8. A storage facility, comprising:
a storage system, and
a first computer in communication with the storage system and configured:
to define at least two priority levels for storage management commands to be processed by the storage system,
to define a respective queue for each of the defined priority levels,
to receive, from one or more second computers in communication with the first computer and the storage system, multiple storage management commands,
to determine a respective priority for each of the received storage management commands,
to identify the respective queue for each of the received storage management commands based on the respective priority thereof, and
to load each of the received storage management commands to the respective identified queue thereof.

9. The storage facility according to claim 8, wherein the storage system is configured to process the received storage management commands stored in the respective queues according to the priority levels thereof.

10. The storage facility according to claim 9, wherein the storage system is configured to process the storage management commands by fetching the storage management commands from the respective queues in a round-robin order, and performing the storage management commands in the round-robin order.

11. The storage facility according to claim 8, wherein the first computer is configured to determine the respective priority of a given storage management command by determining a time sensitivity of the given storage management command, and assigning the respective priority based on the time sensitivity.

12. The storage facility according to claim 8, wherein the first computer is configured to determine the respective priority of a given storage management command by determining length of execution time of the given storage management command, and assigning the respective priority based on the length of execution time.

13. The storage facility according to claim 8, wherein each of the one or more second computers has a respective storage profile, and wherein d wherein the first computer is configured to determine the respective priority of a given storage management command by identifying a respective storage profile of a given second computer that conveyed the given storage management command, and assigning the respective priority based on the identified storage profile.

14. The storage facility according to claim 8, wherein the first computer is configured to identify, in a given queue, multiple storage management commands that perform a similar function, and combining the multiple storage management commands into a single storage management command.

15. A computer program product, the computer program product comprising:
a non-transitory computer readable storage medium having computer readable program code embodied therewith, the computer readable program code comprising:
computer readable program code executing on a first computer in communication with a storage system and configured:
to define at least two priority levels for storage management commands to be processed by the storage system;
to define a respective queue for each of the defined priority levels;
to receive, from one or more second computers in communication with the first computer and the storage system, multiple storage management commands;
to determine a respective priority for each of the received storage management commands;
to identify the respective queue for each of the received storage management commands based on the respective priority thereof; and
to load each of the received storage management commands to the respective identified queue thereof; and computer readable program code executing on the storage system and configured to process the received storage management commands stored in the respective queues according to the priority levels thereof.

16. The computer program product according to claim 15, wherein the computer readable program code is configured to determine the respective priority of a given storage management command by determining a time sensitivity of the given storage management command, and assigning the respective priority based on the time sensitivity.

17. The computer program product according to claim 15, wherein the computer readable program code is configured to determine the respective priority of a given storage management command by determining length of execution time of the given storage management command, and assigning the respective priority based on the length of execution time.

18. The computer program product according to claim 15, wherein each of the one or more second computers has a respective storage profile, and wherein the computer readable program code is configured to determine the respective priority of a given storage management command by identifying a respective storage profile of a given second computer that conveyed the given storage management command, and assigning the respective priority based on the identified storage profile.

19. The computer program product according to claim 15, and comprising computer readable program code executing on the first computer and configured to identify, in a given queue, multiple storage management commands that perform a similar function, and to combine the multiple storage management commands into a single storage management command.

20. The computer program product according to claim 15, wherein the computer readable program code executing on the storage system is configured to process the storage management commands by fetching the storage management commands from the respective queues in a round-robin order, and performing the storage management commands in the round-robin order.

* * * * *